Figure 1:
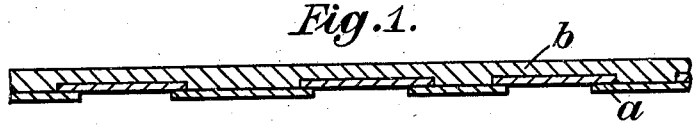

Dec. 9, 1930.  A. LLOYD  1,784,737

MANUFACTURE OF MICA TUBES AND SHEETS

Filed Aug. 1, 1928

INVENTOR
Arthur Lloyd
By Watson, Cait, Morse & Grindle
Attys

Patented Dec. 9, 1930

1,784,737

UNITED STATES PATENT OFFICE

ARTHUR LLOYD, OF LONDON, ENGLAND, ASSIGNOR TO BAKELITE LIMITED, OF LONDON ENGLAND, A BRITISH COMPANY

MANUFACTURE OF MICA TUBES AND SHEETS

Application filed August 1, 1928, Serial No. 296,797, and in Great Britain August 15, 1927.

This invention relates to an improved manufacture of mica tubes and sheets.

For the manufacture of mica tubes and sheets by building up by means of a binder from mica flake for the purpose of insulation, natural and certain synthetic resins have been used in the past.

In the case of natural resins such as shellac, the finished products have the disadvantage of being softened by appreciably low temperatures, e. g. between 70 and 100° C. It is then an easy matter to slide the laminations one over the other. As the temperature rises decomposition sets in.

Certain other types of synthetic resins have been used, such as those manufactured from glycerine and phthalic acid but the process involved in building up tubes and sheets using these resins is a lengthy process and requires comparatively high temperatures or a long period of heating to make them infusible.

It is well-known that phenol-formaldehyde resins are not satisfactory for this purpose as there is a lack of adhesion between mica and such binders which causes tubes and sheets so made to readily flake and break apart when stoved. Of the theory of this action of flaking and breakage the inventor is not certain, the action is possibly due to the presence of a water film in spaces between the resin and the mica.

It has been found that a phenol-urea-formaldehyde resin, has considerable advantage over many other natural or synthetic resins for the purpose of binding mica flakes together.

According to the present invention the manufacture of tubes, plates or sheets containing mica comprises the following steps in the order in which they are named:—

(a) Taking a layer of mica and spreading upon it or dipping it into a solution of a phenol-urea-aldehyde condensation product and thereby forming a continuous sheet or layer compounded of the mica and the solution;

(b) Evaporating the solvent and partially hardening the phenol-urea-aldehyde product by heating sufficiently to prevent sticking when the sheets are stored in stacks.

The sheet or layer compounded of the mica and the solution partially hardened may be submitted to a subsequent step which consists in moulding it to any desired shape by rolling onto a heated former or pressing into a heated mould and heating on the former or mould to the hardening temperature of the condensation product employed as a binder for a sufficient time to convert the latter into its insoluble form. The sheets of mica and partially hardened condensation product may also according to the invention consist of a plurality of layers and the layers of the plurality may be bonded together by the condensation product.

Furthermore according to the invention a plasticizer may be incorporated into the solution of condensation products before building up the sheets in order to make the material more flexible; such plasticizers may be used as those usually employed by the synthetic resin industry.

According to a preferred method of carrying out the invention the binder between the mica constituents of the article is a phenol-urea-formaldehyde condensation product whose constituents are in the following proportions by weight:—

|  | Parts by weight |
|---|---|
| Phenol | 100 |
| Urea | 60 |
| 40% solution of formaldehyde in water | 250 |

Figure 2:
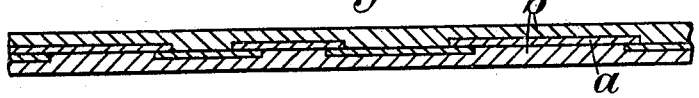
Figure 3:
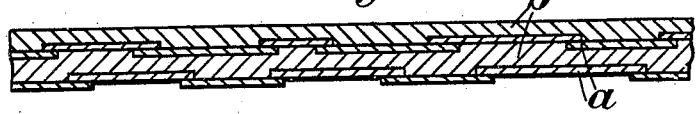
Figure 4:
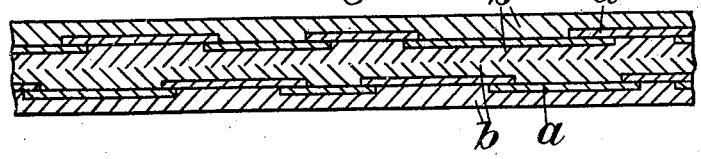

In carrying out the invention the following is one convenient mode of procedure:— The phenol-urea-formaldehyde condensation product is dissolved in ordinary industrial alcohol or any other suitable solvent or combination of solvents, thus making a varnish. The varnish is now applied to the mica flakes according to one of two alternative methods which are illustrated in the accompanying Figures 1–4. A desired area of a hot plate may be covered with overlapping flakes of mica and the varnish applied by spraying, pouring or brushing on to the surface of the flakes. The varnish flows in all directions and thus binds the flakes together. The heat of the hot plate drives off the volatile solvent employed and partially hardens the phenol-urea-formaldehyde products. A sheet is then produced such as illustrated in Figure 1 where the overlapping mica sheets *a* are bound together by a layer of condensation product *b*. Further flakes can be added to this layer and the process repeated until a sheet of desired thickness is obtained. Two such layers are represented in Figure 3. Alternatively the mica flakes or sheets may be coated with the varnish or solution of condensation product by immersing them in the varnish and then heating them on a hot plate sufficiently long to drive off the volatile substances employed and to partially harden the phenol-urea-formaldehyde products. A sheet then will be obtained such as that illustrated in Figure 2 where the condensation product *b* completely surrounds the mica sheets *a* and as in the former case further flakes can be added to this layer and the process repeated until a sheet of desired thickness is obtained. Two such layers are illustrated in Figure 4. The sheets thus obtained by either of these methods can readily be handled and stacked together without sticking and may thus be stored until required for any specific purpose when they can be cut into the desired shape or length.

Square and round tubes are made of this bonded mica by rolling a length of sheet over a hot plate on a former in the manner usually employed and while still on the former the whole is stoved from room temperature up to about 300° F. (say 150° C.) taking altogether about three hours for the stoving and maintaining the articles at this latter temperature for the last two hours.

Square tubes, sheets, plates and other shaped articles can be similarly made by pressing in a mould to the desired shape and heating in a similar manner while continuing the pressure.

Sheets or plates or tubes of mica made in the manner hereinbefore described do not break up or flake when stoved and there is complete adhesion between the mica and the binder. Articles thus made are chemically resistant, mechanically strong and have good insulating properties and electrically they have volume and surface resistivity which is as good as mica bonded with shellac. The binder will not soften at any temperature and is no longer soluble in the usual solvents or oils. It does not char until heated to 310° C. When subjected to the heat of a carbon arc charring does not spread beyond the area under the arc.

Sheets or tubes built up with this binder find valuable use in the electrical industry, for example, as end shrouds for commutators, etc. This phenol-urea-formaldehyde product does not exhibit the same tendency to "track", the phenomenon usually associated with phenol-formaldehyde resins.

Articles built up in the manner hereinbefore described can be immersed in boiling water for several minutes without softening and by prolonged stoving they can be made completely resistant against prolonged immersion.

I claim:

1. A new article of manufacture being a sheet containing mica in which the binder between the mica constituents of the article is a condensation product from a phenol, a urea, and an aldehyde.

2. A new article of manufacture being a sheet containing mica in which the binder between the mica constituents of the article is a condensation product from phenol, urea, and formaldehyde in which the constituents are in the following proportions by weight:—

| | Parts by weight |
|---|---|
| Phenol | 100 |
| Urea | 60 |
| 40% solution of formaldehyde in water | 250 |

In testimony whereof I affix my signature.

ARTHUR LLOYD.